(12) United States Patent
Yamaguchi et al.

(10) Patent No.: US 9,268,022 B2
(45) Date of Patent: Feb. 23, 2016

(54) UNDERWATER DETECTION DEVICE AND UNDERWATER DETECTING METHOD

(75) Inventors: Takeharu Yamaguchi, Nishinomiya (JP); Nicolas Borrallo, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 986 days.

(21) Appl. No.: 13/446,283

(22) Filed: Apr. 13, 2012

(65) Prior Publication Data

US 2012/0263018 A1 Oct. 18, 2012

(30) Foreign Application Priority Data

Apr. 14, 2011 (JP) .................. 2011-090436

(51) Int. Cl.
*G01S 15/96* (2006.01)
*G01S 7/524* (2006.01)
*G01S 7/527* (2006.01)
*G01S 15/10* (2006.01)

(52) U.S. Cl.
CPC ................. *G01S 15/96* (2013.01); *G01S 7/524* (2013.01); *G01S 7/5276* (2013.01); *G01S 15/102* (2013.01)

(58) Field of Classification Search
CPC ....... G01S 7/524; G01S 7/5276; G01S 15/96; G01S 15/102
See application file for complete search history.

(56) References Cited

U.S. PATENT DOCUMENTS

| | | | | |
|---|---|---|---|---|
| 4,136,341 A | * | 1/1979 | Mulder et al. | 342/160 |
| 4,626,855 A | * | 12/1986 | Rouse | 342/201 |
| 4,924,449 A | * | 5/1990 | Guigne | 367/104 |
| 4,953,143 A | * | 8/1990 | Higgins et al. | 367/88 |
| 5,815,465 A | * | 9/1998 | Turgut | 367/87 |
| 5,991,236 A | * | 11/1999 | Yamamoto | 367/41 |
| 2005/0036404 A1 | * | 2/2005 | Zhu et al. | 367/88 |
| 2007/0286019 A1 | * | 12/2007 | Love et al. | 367/25 |
| 2008/0136704 A1 | * | 6/2008 | Chan et al. | 342/201 |

(Continued)

FOREIGN PATENT DOCUMENTS

| | | |
|---|---|---|
| JP | 2002-202362 A | 7/2002 |
| JP | 2009-069164 A | 4/2009 |
| JP | 4348415 B2 | 10/2009 |

OTHER PUBLICATIONS

CGGE International, http://www.cggeinternational.com/MAK-1M.htm, Oct 2003, pp. 1-3.*
Volgin, Marine Geology, 132, 1996, 39-52.*

(Continued)

*Primary Examiner* — Luke Ratcliffe
*Assistant Examiner* — Hovhannes Baghdasaryan
(74) *Attorney, Agent, or Firm* — Global IP Counselors, LLP (57) ABSTRACT

This disclosure provides an underwater detection device, which includes a first generator for generating a first transmission signal, a second generator for generating a second transmission signal having a longer pulse width than that of the first transmission signal, an output unit for outputting the transmission signals generated by the first and second generators to a transducer for transmitting underwater ultrasonic waves based on the first and second transmission signals, respectively, receiving the reflection waves caused by the ultrasonic waves, respectively, and converting the reflection waves into a first reception signal and a second reception signal, respectively, an underwater detector for detecting at least one of a presence of a target object and a water bottom depth based on the first reception signal, and a bottom sediment discriminator for discriminating a water bottom sediment type based on the second reception signal.

4 Claims, 6 Drawing Sheets

(56) References Cited

U.S. PATENT DOCUMENTS

2009/0122642 A1* 5/2009 Komatsu et al. ............... 367/21
2009/0303835 A1  12/2009 Asada

OTHER PUBLICATIONS

Office Action of the corresponding Chinese Patent Application No. 201210124102.5, dated Jul. 28, 2015.

* cited by examiner

| | TRANSMISSION PULSE | | COMPARISON | RECEPTION FILTER BANDWIDTH | | COMPARISON | COMPARISON |
|---|---|---|---|---|---|---|---|
| RANGE [m] | PULSE WIDTH T1 [ms] | PULSE WIDTH T2 [ms] | SN RATIO [dB] | PULSE WIDTH T1 [kHz] | PULSE WIDTH T2 [kHz] | SN RATIO [dB] | TOTAL [dB] |
| ⋮ | ⋮ | ⋮ | ⋮ | ⋮ | ⋮ | ⋮ | ⋮ |
| 100 | 1.0 | 3.0 | 4.8 | 1.5 | 0.5 | 4.8 | 9.5 |
| 120 | 1.0 | 3.6 | 5.6 | 1.5 | 0.4 | 5.6 | 11.1 |
| 140 | 1.0 | 4.2 | 6.2 | 1.5 | 0.4 | 6.2 | 12.5 |
| 160 | 1.0 | 4.8 | 6.8 | 1.5 | 0.3 | 6.8 | 13.6 |
| 180 | 1.0 | 5.0 | 7.0 | 1.5 | 0.3 | 7.0 | 14.0 |
| 200 | 1.0 | 5.0 | 7.0 | 1.5 | 0.3 | 7.0 | 14.0 |

UNDERWATER DETECTION DEVICE AND UNDERWATER DETECTING METHOD

CROSS-REFERENCE TO RELATED APPLICATION(S)

The application claims priority under 35 U.S.C. §119 to Japanese Patent Application No. 2011-090436, which was filed on Apr. 14, 2011 the entire disclosure of which is hereby incorporated by reference.

1. Technical Field

The present invention relates to a fish finder, an underwater detection device, an underwater detecting method, and a computer readable media storing underwater detecting program, in which the underwater detection is performed by transmitting an ultrasonic wave underwater and based on a reflection wave caused by the ultrasonic wave.

2. Background of the Invention

Conventionally, as fish finders used for ships, a fish finder for discriminating a sea bottom sediment type (rocks, stones, sand, etc.) and displaying the sediment type has been known (see JP4348415B). The bottom sediment discrimination is performed by analyzing a sea bottom echo of a transmission pulse of an ultrasonic wave. For example, in a location where the sea bottom is hard like rocks or stones with a bumpy surface, a time width of the sea bottom echo is longer and, whereas, in a location where the sea bottom is soft like sand or mud with a relatively flat surface, the time width of the sea bottom echo is shorter. On a display screen, a similarity of the sea bottom echo with each bottom sediment type and the most similar bottom sediment type among the bottom sediment types are typically displayed.

However, because fish finders are generally for detecting a school-of-fish accurately, a transmission pulse width of the ultrasonic wave to be transmitted therefrom is relatively shorter so as to achieve a high resolution in distance. With the shorter transmission pulse width, an energy of the ultrasonic wave drops and a detectable distance range shrinks; thereby, the bottom sediment discrimination at a deep depth is difficult.

SUMMARY OF THE INVENTION

Thus, the present invention is made in view of the above situations, and provides a fish finder, an underwater detection device, an underwater detecting method, and a computer readable media storing underwater detecting program, which can both detect fish and/or a water bottom depth and discriminate a sea bottom sediment type accurately, with a single device.

According to one aspect of the invention, an underwater detection device is provided, which includes a first generator for generating a first transmission signal, a second generator for generating a second transmission signal having a longer pulse width than that of the first transmission signal, an output unit for outputting the transmission signals generated by the first and second generators to a transducer for transmitting underwater ultrasonic waves based on the first and second transmission signals, respectively, receiving the reflection waves caused by the ultrasonic waves, respectively, and converting the reflection waves into a first reception signal and a second reception signal, respectively, an underwater detector for detecting at least one of a presence of a target object and a water bottom depth based on the first reception signal, and a bottom sediment discriminator for discriminating a water bottom sediment type based on the second reception signal.

With this configuration, the detection of at least one of the target object (e.g., fish) and the water bottom depth and the discrimination of the water bottom sediment type are performed based on the ultrasonic waves dedicated for the respective purposes, which have the different pulse widths from each other. The ultrasonic wave for the detection of at least one of the target object and the water bottom depth is required to have a higher distance resolution, that is, a shorter pulse width, so as to detect at least one of a length and kind of the target object, and the water bottom depth. On the other hand, the ultrasonic wave for the water bottom sediment type discrimination is required to have a stronger energy (signal intensity) and a longer detection range and larger SN ratio, that is a longer pulse width. Thus, by using the pulse width of the ultrasonic wave for the water bottom sediment type discrimination longer than the pulse width of the ultrasonic wave for the detection of at least one of the target object and the water bottom depth, both the detection of at least one of the target object and the water bottom depth and the discrimination of the water bottom sediment type can be performed by a single device.

According to another aspect of the invention, an underwater detection device is provide, which includes a first generator for generating a first transmission signal of which a frequency changes, a second generator for generating a second transmission signal with a fixed frequency, an output unit for outputting the transmission signals generated by the first and second generators to a transducer for transmitting underwater ultrasonic waves based on the first and second transmission signals, respectively, receiving the reflection waves caused by the ultrasonic waves, respectively, and converting the reflection waves into a first reception signal and a second reception signal, respectively, a setting unit for causing the first generator to generate the first transmission signal through a frequency modulation, pulse compressing the first reception signal, and causing the second generator to generate the second transmission signal having a longer pulse width than the pulse compressed first reception signal, an underwater detector for detecting at least one of a presence of a target object and a water bottom depth based on the pulse compressed first reception signal, and a bottom sediment discriminator for discriminating a water bottom sediment type based on the second reception signal.

With this configuration, by generating the second transmission signal having the pulse width longer than that of the pulse compressed first reception signal, the detection of at least one of the target object and the water bottom depth based on the pulse compressed reception signal. The ultrasonic wave for the detection of at least one of the target object and the water bottom depth is required to have a long detection range, the SN ratio of the reception signal that is accurate for the detection, and a high distance resolution (high ability of distinguishing a group of the target objects). However, if the pulse width of the ultrasonic wave is short so as to achieve the high distance resolution, the energy of the ultrasonic wave drops, and as a result, the detection range is shortened and the SN ratio is reduced. On the other hand, if the pulse width of the ultrasonic wave is long, the target object of which a length is shorter than the pulse width, cannot be detected and the distance resolution degrades. Whereas, the ultrasonic wave for the water bottom sediment type discrimination is not required such a high distance resolution, and, because the water bottom is a huge (widespread) reflection body that causes the reflection wave to scatter (secondary reflection or reverb), if the frequency of the transmission signal is modulated to have a wide band, a noise included in the reflection wave from the water bottom increases. Therefore, by modulating only the frequency of the transmission signal for the detection of at least one of the target object and the water bottom depth (target object group detection) and pulse compressing the reception signal, similar effect to when the ultrasonic wave having the short pulse width is transmitted and received can be obtained without reducing the energy. As a result, the detection of at least one of the target object and the water bottom depth and the water bottom sediment type discrimination can be performed accurately.

The underwater detection device may further include a first filter for filtering the first reception signal, and a second filter for filtering the second reception signal, the second filter having a narrower band width than that of the first filter.

With this configuration, because a filter bandwidth can be narrowed as the pulse width of the transmission signal is longer, the second filter can have a narrower band width than that of the first filter, and as a result, the SN ratio of the second reception signal can further be increased than that of the first reception signal.

The output unit may output the first and second transmission signals alternately.

With this configuration, by transmitting the ultrasonic wave for the detection of at least one of the target object and the water bottom depth and the ultrasonic wave for the water bottom sediment type discrimination, both the detection of at least one of the target object and the water bottom depth and the discrimination of the water bottom sediment type can be performed by using a single transducer.

The underwater detection device may further include a display unit for displaying a detection result obtained from the underwater detector, and a discrimination result obtained from the bottom sediment discriminator.

The display unit may not be included in the fish finder, and a display device installed in a ship in advance may be used alternatively.

According to another aspect of the invention, a method of performing an underwater detection based on reflection waves caused by transmitting ultrasonic waves underwater is provided. The method includes generating a first transmission signal, generating a second transmission signal having a longer pulse width than that of the first transmission signal, outputting the generated transmission signals to a transducer for transmitting underwater the ultrasonic waves based on the first and second transmission signals, respectively, receiving the reflection waves, and converting the reflection waves into a first reception signal and a second reception signal, respectively, detecting at least one of a presence of a target object and a water bottom depth based on the first reception signal, and discriminating a water bottom sediment type based on the second reception signal.

With this configuration, the detection of at least one of the target object (e.g., fish) and the water bottom depth and the discrimination of the water bottom sediment type are performed based on the ultrasonic waves dedicated for the respective purposes, which have the different pulse widths from each other. The ultrasonic wave for the detection of at least one of the target object and the water bottom depth is required to have a higher distance resolution, that is, a shorter pulse width, so as to detect at least one of a length and kind of the target object, and the water bottom depth. On the other hand, the ultrasonic wave for the water bottom sediment type discrimination is required to have a stronger energy (signal intensity) and a longer detection range and larger SN ratio, that is a longer pulse width. Thus, by using the pulse width of the ultrasonic wave for the water bottom sediment type discrimination longer than the pulse width of the ultrasonic wave for the detection of at least one of the target object and the water bottom depth, both the detection of at least one of the target object and the water bottom depth and the discrimination of the water bottom sediment type can be performed by a single device.

According to another aspect of the invention, computer readable media configured to store in a non-transitory manner a computer executable program, which upon execution by a processor of a computer causes the computer to perform an underwater detection based on reflection waves caused by transmitting ultrasonic waves according to a method is provided. The program includes causing a computer to generate a first transmission signal, causing a computer to generate a second transmission signal having a longer pulse width than that of the first transmission signal, causing a computer to output the generated transmission signals to a transducer for transmitting underwater the ultrasonic waves based on the first and second transmission signals, respectively, receiving the reflection waves, and converting the reflection waves into a first reception signal and a second reception signal, respectively, causing a computer to detect at least one of a presence of a target object and a water bottom depth based on the first reception signal, and causing a computer to discriminate a water bottom sediment type based on the second reception signal.

With this configuration, the detection of at least one of the target object (e.g., fish) and the water bottom depth and the discrimination of the water bottom sediment type are performed based on the ultrasonic waves dedicated for the respective purposes, which have the different pulse widths from each other. The ultrasonic wave for the detection of at least one of the target object and the water bottom depth is required to have a higher distance resolution, that is, a shorter pulse width, so as to detect at least one of a length and kind of the target object, and the water bottom depth. On the other hand, the ultrasonic wave for the water bottom sediment type discrimination is required to have a stronger energy (signal intensity) and a longer detection range and larger SN ratio, that is a longer pulse width. Thus, by using the pulse width of the ultrasonic wave for the water bottom sediment type discrimination longer than the pulse width of the ultrasonic wave for the detection of at least one of the target object and the water bottom depth, both the detection of at least one of the target object and the water bottom depth and the discrimination of the water bottom sediment type can be performed by a single device.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Hereinafter, a suitable embodiment of a fish finder, an underwater detection device, an underwater detecting method, and a computer readable media storing underwater detecting program according to the present invention is described with reference to the appended drawings. The fish finder 1 transmits an ultrasonic wave pulse (hereinafter, may simply be referred to as "the ultrasonic wave") from an oscillator toward a water bottom, and receives, by the oscillator, a reflection wave that is the ultrasonic wave reflected on, for example, a school-of-fish or the water bottom. The fish finder 1 performs calculation processing on the received reflection wave, and displays an image (echo data) of the school-of-fish or the water bottom on a display unit based on the processing result. Note that, the term "water bottom" as used herein refers to any water bottom or any water bottom surface at sea, lake, river, etc.

Figure 1:
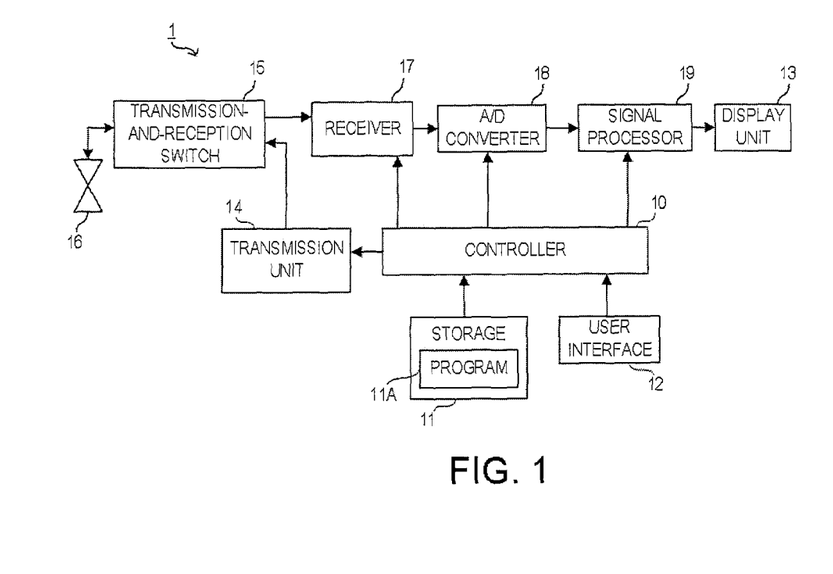
FIG. 1 is a block diagram schematically showing a configuration of a fish finder according to an embodiment of the present invention.

FIG. 1 is a block diagram schematically showing a configuration of the fish finder 1 in this embodiment. The fish finder 1 includes a controller 10 (setting unit), a storage 11, a user interface 12, a display unit 13, a transmission unit 14, a transmission-and-reception switch 15, a transducer 16, a receiver 17, an A/D converter 18, and a signal processor 19.

The storage 11 is, for example, a nonvolatile memory, such as Read Only Memory (ROM), and stores a required program 11A and various data. The user interface 12 receives various instruction inputs from an operator, for example, to set a water bottom detection range (water bottom depth). The display unit 13 displays echo data by having a vertical axis of a display screen thereof as a depth direction and a horizontal axis thereof as a time direction. The display unit 13 may not be included in the fish finder 1, and a display device installed in a ship in advance may be used alternatively.

The controller 10 includes a microcomputer. The controller 10 reads out the program 11A stored in the storage 11 and controls the fish finder 1 overall in response to the various instruction inputs by the operator through the user interface 12. For example, the controller 10 sets a transmission cycle (described later) and the water bottom detection range of transmission signals for the transmission unit 14, sets a sampling cycle for the A/D converter 18, and passes on the instruction to the signal processor 19 to perform various processing.

The transmission unit 14 outputs to the transducer 16 two generated transmission signals alternately at the transmission cycle set through the controller 10, via the transmission-and-reception switch 15 internally built with a trap circuit. The detailed configuration of the transmission unit 14 is further described later.

The transducer 16 is arranged at, for example, a bottom of the ship, and includes a plurality of ultrasonic wave oscillators. Based on the transmission signals from the transmission unit 14, the transducer 16 transmits ultrasonic waves underwater. Further, the transducer 16 receives, by the ultrasonic wave oscillator, the reflection wave caused by the transmitted ultrasonic wave reflecting on a target object group (e.g., the school-of-fish) or the water bottom, generates an echo signal according to an intensity of the reflection wave, and outputs it to the receiver 17 via the transmission-and-reception switch 15. The transducer 16 may not be included in the fish finder 1 and, a transducer installed in the ship in advance may be used alternatively. Hereinafter, the echo signal caused by reflecting on fish is referred to as the fish echo (first reception signal) and the echo signal caused by reflecting on the water bottom is referred to as the water bottom echo (second reception signal).

The receiver 17 amplifies the echo signal inputted from the transducer 16 and outputs it to the A/D converter 18. The A/D converter 18 samples the echo signal at a predetermined timing, converts it into a digital signal, and outputs it to the signal processor 19. The timing for the sampling is set by the controller 10 based on a distance resolution in the depth direction.

The signal processor 19 stores the digitalized echo signal in a memory (not illustrated) sequentially. The signal processor 19 filters the stored echo signal by using a reception filter to remove a noise element that is outside a predetermined frequency band therefrom, and performs school-of-fish detection processing, water bottom detection processing, and bottom sediment discrimination processing. The reception filter is provided for each of the two kinds of echoes. Information showing the result of the school-of-fish detection, the water bottom detection, and the bottom sediment discrimination performed by the signal processor 19 is displayed on the display unit 13.

Figure 2:
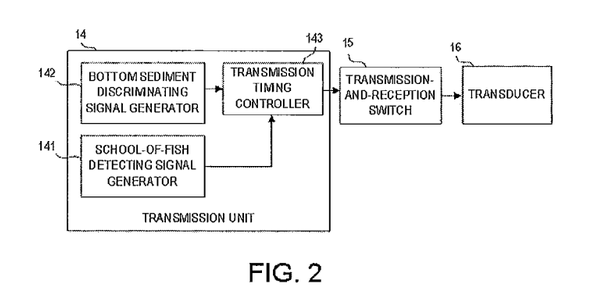
FIG. 2 is a block diagram schematically showing a configuration of a transmission unit.

Next, the transmission unit 14 is described. FIG. 2 is a block diagram schematically showing a configuration of the transmission unit 14. The transmission unit 14 includes a school-of-fish detecting signal generator 141 (first generator), a bottom sediment discriminating signal generator 142 (second generator), and a transmission timing controller 143 (signal outputting module).

The school-of-fish detecting signal generator 141 generates a frequency modulation chirp signal (FM chirp signal) as one of the transmission signals which is for detecting the school-of-fish, based on the instruction through the controller 10. The FM chirp signal (first transmission signal) is a signal of which a frequency suitable for the school-of-fish detection is swept in terms of time. An amplitude of the signal is constant but the frequency changes from a lowest frequency to a highest frequency within a time length corresponding to a wavelength of the signal.

The ultrasonic wave for school-of-fish detection (hereinafter, may be referred to as "the fish ultrasonic wave") is required to have a high distance resolution (high ability of distinguishing the school-of-fish). If a pulse width of the ultrasonic wave is long, a target object such as fish, of which a length is shorter than the pulse width, cannot be detected and the distance resolution degrades. However, if the pulse width of the ultrasonic wave is short so as to achieve a high distance resolution, an energy (signal intensity) of the ultrasonic wave drops, a signal-to-noise ratio (SN ratio) is reduced, and fish cannot be detected accurately. Therefore, the fish ultrasonic wave based on the FM chirp signal generated by the school-of-fish detecting signal generator 141 is transmitted for a predetermined time period, and the fish echo obtained by reflecting on the target object (fish) is pulse compressed. Thereby, an effect similar to when the ultrasonic wave having the short pulse width and a strong energy is transmitted and received can be obtained and, thus, allows the transmission and reception of the ultrasonic wave suitable for school-of-fish detection. Note that, the fish ultrasonic wave can also be used as the ultrasonic wave for detecting a depth underwater.

The bottom sediment discriminating signal generator 142 generates a fixed frequency signal (second transmission signal) as the other one of the transmission signals which is for discriminating a water bottom sediment type, based on the instruction through the controller 10. The bottom sediment discriminating signal generator 142 generates the transmission signal having a pulse width longer than at least the pulse width of the pulse compressed fish echo and determined according to the water bottom detection range. In the bottom sediment discrimination, a property of the water bottom echo is analyzed. For example, when the energy of the water bottom echo is strong, the water bottom echo is discriminated as a water bottom of which the water bottom sediment type is hard, such as a rock ground or a rock reef. When the energy of the water bottom echo is weak, the water bottom echo is discriminated as a water bottom of which the water bottom sediment type is soft, such as a sand ground. Therefore, unlike the fish ultrasonic wave, the ultrasonic wave for the bottom sediment discrimination (hereinafter, may be referred to as "the water bottom ultrasonic wave") does not require the high distance resolution while requires a strong energy and a high SN ratio. For this reason, the bottom sediment discriminating signal generator 142 generates the transmission signal having the pulse width longer than at least the pulse width of the pulse compressed fish echo. This transmission signal is outputted to the transducer 16, and then the transducer 16 transmits the ultrasonic wave having the pulse width of the generated transmission signal.

Note that, if the school-of-fish detection is performed through the school-of-fish detecting signal generator 141 generating the fixed frequency signal and without pulse compressing the fish echo, the bottom sediment discriminating signal generator 142 generates a transmission signal having a pulse width longer than that of the transmission signal generated by the school-of-fish detecting signal generator 141. Thereby, the fish finder 1 transmits the water bottom ultrasonic wave having the pulse width longer than the fish ultrasonic wave.

The transmission timing controller 143 outputs the transmission signals generated by the school-of-fish detecting signal generator 141 and the bottom sediment discriminating signal generator 142 to the transducer 16 via the transmission-and-reception switch 15 at predetermined timings alternately. That is, the fish finder 1 transmits the fish ultrasonic wave and the water bottom ultrasonic wave from the transducer 16 alternately. Specifically, the fish finder 1 transmits the fish ultrasonic wave and receives the reflection wave thereof, and then transmits the water bottom ultrasonic wave and receives the reflection wave thereof.

Figure 3:
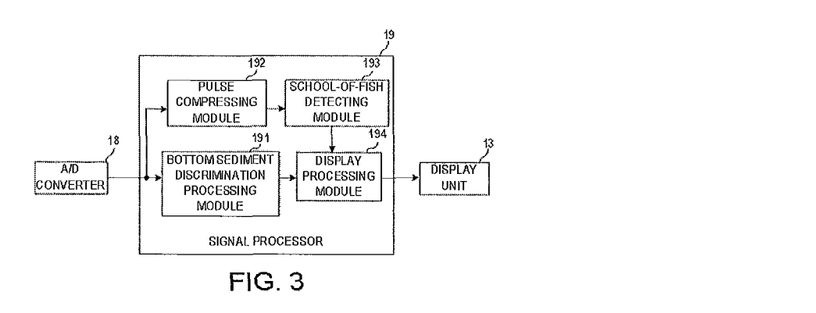
FIG. 3 a block diagram schematically showing a configuration of a signal processor.

Hereinafter, the processing of the signal processor 19 is explained in detail. FIG. 3 is a block diagram schematically showing a configuration of the signal processor 19. The signal processor 19 includes a bottom sediment discrimination processing module 191 (bottom sediment discriminating module), a pulse compressing module 192 (setting unit), a school-of-fish detecting module 193 (underwater detecting module), and a display processing module 194.

The bottom sediment discriminating module 191 is inputted with the echo signal from the A/D converter 18. The bottom sediment discriminating module 191 stores echo signal(s) for one measurement (one ping) in a memory (not illustrated) and performs processing described later every time the echo signal(s) for one ping is stored. The bottom sediment discriminating module 191 discriminates the water bottom sediment type based on the water bottom echo. The manner of discriminating the bottom sediment type is not particularly limited, and may be based on a matching level (similarity) of the water bottom echo with reference data. That is, the bottom sediment discriminating module 191 obtains the water bottom depth from the inputted echo signal, and, through using the echo signal within a predetermined time length range from the water bottom depth (i.e., the echo signal having an energy above a predetermined threshold) as the water bottom echo, matches a pattern of the water bottom echo with the reference data so as to calculate a similarity. As the manner of matching, the fuzzy inference or neural network may be used. The reference data includes plural kinds of data of mud, sand, stones and rocks, etc. Therefore, the strong energy and the high SN ratio are required to the water bottom echo.

Note that, a manner of obtaining the water bottom depth may be based on any of the following timings: a timing at which the echo signal has an energy above a predetermined value, a timing at which a differential value reaches the highest value, and a timing at which a correlation value of the echo signal with a reference signal having a waveform similar to the pulse width of the transmitted ultrasonic wave reaches a highest value.

The pulse compressing module 192 pulse compresses the fish echo. Specifically, the pulse compressing module 192 performs correlation processing on the fish echo and the FM chirp signal by a matched filter, extracts only a frequency band corresponding to the FM chirp signal from the fish echo, and removes other frequency band(s). In this manner, the fish echo is pulse compressed. Thereby, the resolution of the fish echo improves and fish can be detected accurately by the school-of-fish detecting module 193 described below.

The school-of-fish detecting module 193 uses the known method to detect the school-of-fish from the pulse-compressed fish echo. The school-of-fish detection includes discriminating a fish body length and a fish kind, and detecting an underwater depth to the school-of-fish. Because the resolution of the fish echo is improved through the pulse compression by the pulse compressing module 192, the school-of-fish detecting module 193 can detect the school-of-fish highly accurately. The school-of-fish detecting module 193 outputs the processing result to the display processing module 194.

Figure 4:
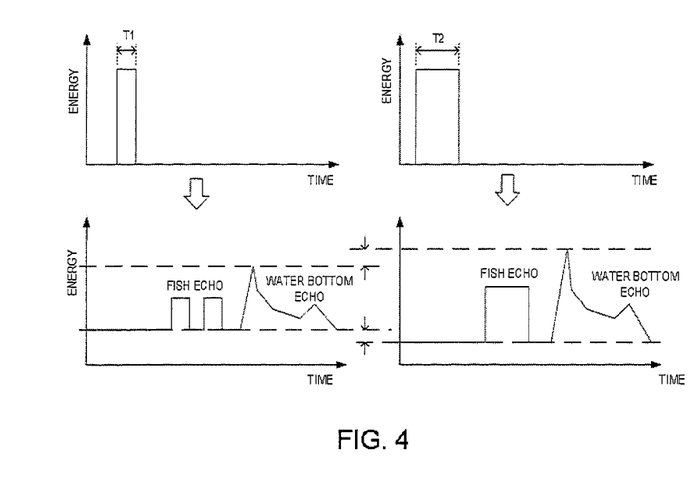
FIG. 4 is charts showing a comparison of echo signal between when an ultrasonic wave is transmitted in a pulse width T1 and when the ultrasonic wave is transmitted in a pulse width T2.

Next, the echo signals obtained as a result of transmitting the ultrasonic waves having different pulse widths are explained. FIG. 4 is charts showing a comparison of echo signal between when an ultrasonic wave having a pulse width T1 is transmitted and when an ultrasonic wave having a pulse width T2 is transmitted. Note that, in FIG. 4, the pulse width T1<the pulse width T2. In FIG. 4, the charts on the left show the case where the ultrasonic wave having the pulse width T1 is transmitted, and the two charts on the right show the case where the ultrasonic wave having the pulse width T2 is transmitted, in which the two upper charts show the transmission pulse, and the two lower charts show the reception pulse. Note that, each chart in FIG. 4 is devised for the convenience of explanation and does not show the actual echo signal. Further, FIG. 4 shows the case where the echo signal is not pulse compressed.

When the ultrasonic wave having the shorter pulse width is transmitted, the distance resolution improves and the accuracy in distinguishing an individual fish (accuracy in distinguishing the fish body length and the fish kind) improves. Therefore, as shown in the two charts on the left in FIG. 4, when the ultrasonic wave having the pulse width T1 is transmitted, the fish echo with higher accuracy can be acquired comparing to the case with the ultrasonic wave having the pulse width T2. Because the school-of-fish detection requires a high distance resolution (the horizontal axis in FIG. 4) but does not require a high energy (the vertical axis in FIG. 4), the ultrasonic wave having the shorter pulse width is suitable.

Whereas, when the ultrasonic wave having the longer pulse width is transmitted, the energy of the reflection wave, the detectable distance range, and the SN ratio increase. Therefore, as shown in the two charts on the right in the FIG. 4, when the ultrasonic wave having the pulse width T2 is transmitted, the energy of the echo signal is stronger and the noise level is decreased (the SN ratio is increased). Therefore, the ultrasonic wave having the longer pulse width is suitable because it does not require a high distance resolution but requires a high energy. Further, in either case with the pulse width T1 or the pulse width T2, it can be understood that a characteristic (shape) of the water bottom obtained from the water bottom echo is the same.

Figure 5:
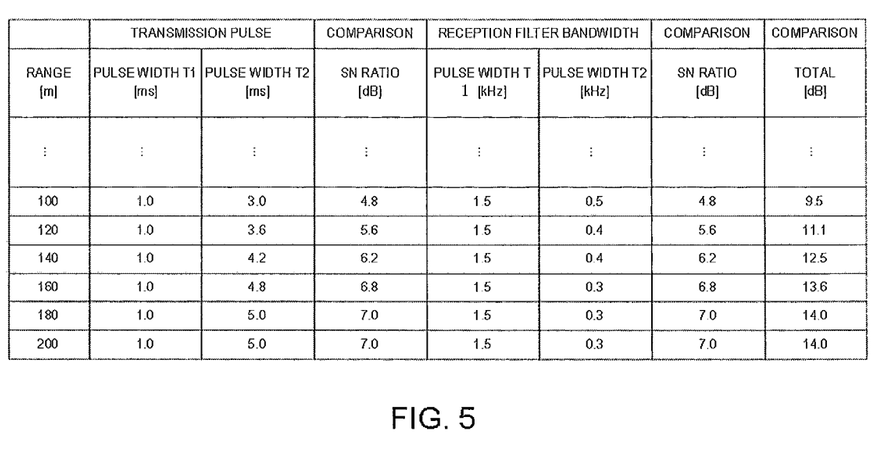
FIG. 5 is a table showing experimental results of a signal-to-noise ratio (SN ratio) obtained when the ultrasonic wave having the pulse width T1 is transmitted and when the ultrasonic wave having the pulse width T2 is transmitted.

Next, the increase of the SN ratio by the transmission of the ultrasonic wave having the longer pulse width is explained. FIG. 5 is a table showing experimental results of the SN ratio obtained when the ultrasonic wave having the pulse width T1 is transmitted and when the ultrasonic wave having the pulse width T2 is transmitted. Note that, the values from the table are rounded to one decimal place. FIG. 5 shows the example of when the detection range is 100 [m], the ultrasonic wave having the pulse width T1 of 1.0 [ms] is transmitted, and then the ultrasonic wave having the pulse width T2 of 3.0 [ms] is transmitted, and as a result, the SN ratio is increased by approximately 4.8 [dB]. Moreover, a reception frequency band width is in proportion to an inverse number of the pulse width; thereby, in the example where a band width of the reception filter (first filter) for the ultrasonic wave having the pulse width T1 of 1.0 [ms] is 1.5 [kHz], a band width of the other reception filter (second filter) for the ultrasonic wave having the pulse width T2 of 3.0 [ms] becomes 0.5 [kHz]. Because the number of noise elements generally reduces when the band width of the filter is narrowed, in this example, the SN ratio is further increased by approximately 4.8 [dB]. In total, the SN ratio is increased by approximately 9.5 [dB]. Thus, by elongating the pulse width T2, the SN ratio increases comparing to the case using the pulse width T1.

Figure 6:
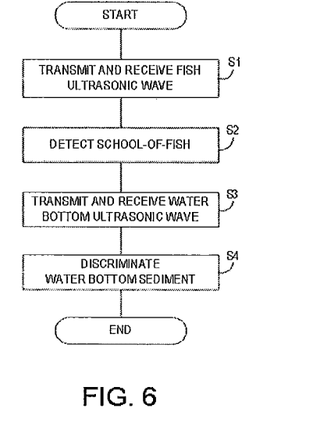
FIG. 6 is a flowchart showing a procedure of processing that is performed by the fish finder.

Hereinafter, the operation of the fish finder 1 is explained. FIG. 6 is a flowchart showing a procedure of processing that is performed by the fish finder 1. The controller 10 reads out the program 11A stored in the storage 11 and, thereby, processing shown in FIG. 6 is performed.

The controller 10 transmits the fish ultrasonic wave from the transducer 16 and it receives the reflection wave (S1). Specifically, the controller 10 generates the FM chirp signal by the transmission unit 14 and outputs it to the transducer 16, and the transducer 16 transmits the fish ultrasonic wave. Further, after the transducer 16 receives the reflection wave, the controller 10 pulse compresses the fish echo outputted from the transducer 16, by the signal processor 19. Next, the controller 10 performs the school-of-fish detection based on the fish echo (S2).

Sequentially, the controller 10 transmits the water bottom ultrasonic wave from the transducer 16 and receives the reflection wave (S3). Here, the controller 10 sets the pulse width of the water bottom ultrasonic wave which is to be transmitted, so as to have the longer pulse width than the pulse compressed fish echo. After the transducer 16 receives the reflection wave, the controller 10 performs the water bottom sediment discrimination by the signal processor 19 based on the water bottom echo outputted from the transducer 16 (S4). Then, the controller 10 finishes the processing.

As explained above, in this embodiment, the fish finder 1 receives the ultrasonic waves having the different pulse widths, and performs the school-of-fish detection and the water bottom sediment discrimination. Because required property differs between the school-of-fish detection and the water bottom sediment discrimination, by differing the pulse width of the reflection wave to be received, the school-of-fish detection and the water bottom sediment discrimination can be performed with a single device.

Note that, the specific configuration of the fish finder 1 may be modified as needed. The functions and effects described in this embodiment are merely illustrations of suitable functions and effects that are derived from the invention, and therefore, they are not limited to the description of the above embodiment.

The transmission unit 14 can generate transmission signals with a plurality of frequencies, and may transmit the transmission signals with two or more kinds of frequencies. For example, as the fish ultrasonic waves, the fish finder 1 may transmit an FM chirp signal of 40 kHz to 80 kHz and an FM chirp signal of 175 kHz to 225 kHz alternately, or alternatively, may transmit a fixed frequency signal of low frequency waves of 60 kHz and a fixed frequency signal of high frequency waves of 200 kHz. Further, as the water bottom ultrasonic wave, the fish finder 1 may transmit a fixed frequency signal of 60 kHz and a fixed frequency signal of 200 kHz alternately.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An underwater detection device, comprising:
    a first generator configured to generate a first transmission signal at a first changing frequency for a first duration of time including a plurality of cycles of the first transmission signal at the first frequency, the first duration of time representing a first pulse width;
    a second generator configured to generate a second transmission signal at a second fixed frequency for a second duration of time, the second duration of time including a plurality of cycles of the second transmission signal at the second frequency and representing a second pulse width;
    an output unit configured to output the first and second transmission signals generated by the first and second generators, respectively, to a transducer to transmit underwater first and second ultrasonic waves having the first and second pulse widths, respectively, based on the first and second transmission signals, respectively, receive first and second reflection waves caused by the first and second ultrasonic waves, respectively, and convert the first and second reflection waves into a first reception signal and a second reception signal, respectively;
    a setting unit configured to cause the first generator to generate the first transmission signal through a frequency modulation, pulse compress the first reception signal, and cause the second generator to generate the second transmission signal having the second pulse width that is longer than the pulse compressed first reception signal;
    an underwater detector configured to detect at least one of a presence of a target object and a water bottom depth based on the pulse compressed first reception signal;

a bottom sediment discriminator configured to discriminate a water bottom sediment type based on the second reception signal; and a display processor configured to output a detection result obtained from the underwater detector and a discrimination result obtained from the bottom sediment discriminator.

2. The underwater detection device of claim 1, further comprising: a first filter for filtering the first reception signal; and a second filter for filtering the second reception signal, the second filter having a narrower band width than that of the first filter.

3. The underwater detection device of claim 2, wherein the output unit outputs the first and second transmission signals alternately.

4. The underwater detection device of claim 2, further comprising a display unit for displaying a detection result obtained from the underwater detector, and a discrimination result obtained from the bottom sediment discriminator.

* * * * *